United States Patent
Alderman

(10) Patent No.: US 8,156,703 B2
(45) Date of Patent: *Apr. 17, 2012

(54) MULTIPLE PHASE PCM HEAT INSULATION BLANKET

(76) Inventor: Robert J. Alderman, Marathon, FL (US)

(*) Notice: Subject to any disclaimer, the term of this patent is extended or adjusted under 35 U.S.C. 154(b) by 291 days.

This patent is subject to a terminal disclaimer.

(21) Appl. No.: 12/624,750

(22) Filed: Nov. 24, 2009

(65) Prior Publication Data

US 2011/0120040 A1    May 26, 2011

(51) Int. Cl.
*E04C 1/00*    (2006.01)
(52) U.S. Cl. .................... 52/309.13; 52/407.3
(58) Field of Classification Search ............. 52/309.13, 52/407.5, 407.3, 404.1, 406.3; 428/69, 72
See application file for complete search history.

(56) References Cited

U.S. PATENT DOCUMENTS

| | | |
|---|---|---|
| 5,626,936 A | 5/1997 | Alderman |
| 5,770,295 A | 6/1998 | Alderman |
| 5,918,436 A | 7/1999 | Alderman |
| 6,557,313 B1 | 5/2003 | Alderman |
| 6,645,598 B2 | 11/2003 | Alderman |
| 6,694,693 B2 | 2/2004 | Alderman |
| 6,811,852 B2 | 11/2004 | Alderman |
| 6,857,238 B2 | 2/2005 | Alderman |

*Primary Examiner* — Basil Katcheves
(74) *Attorney, Agent, or Firm* — Thomas, Kayden, Horstemeyer & Risley, LLP

(57) ABSTRACT

A PCM heat insulation blanket (10) is positioned in a wall structure of a building for modulating the transfer of heat to and from the controlled internal temperature of the building structure. The PCM heat insulation blanket includes an array of pods (12) with one group of pods 12A containing a first PCM and a second group of pods containing a second PCM 12B having a different phase change temperature than the first group of pods. The pods with different PCMs are substantially uniformly intermixed among each other. The pods are formed of laminated sheets, each of which may include a metal foil that is vapor impermeable and tends to maintain the PCMs in the blanket at approximately the same temperature, and which also functions to reflect radiant heat away from the temperature controlled internal space of the building structure.

20 Claims, 5 Drawing Sheets

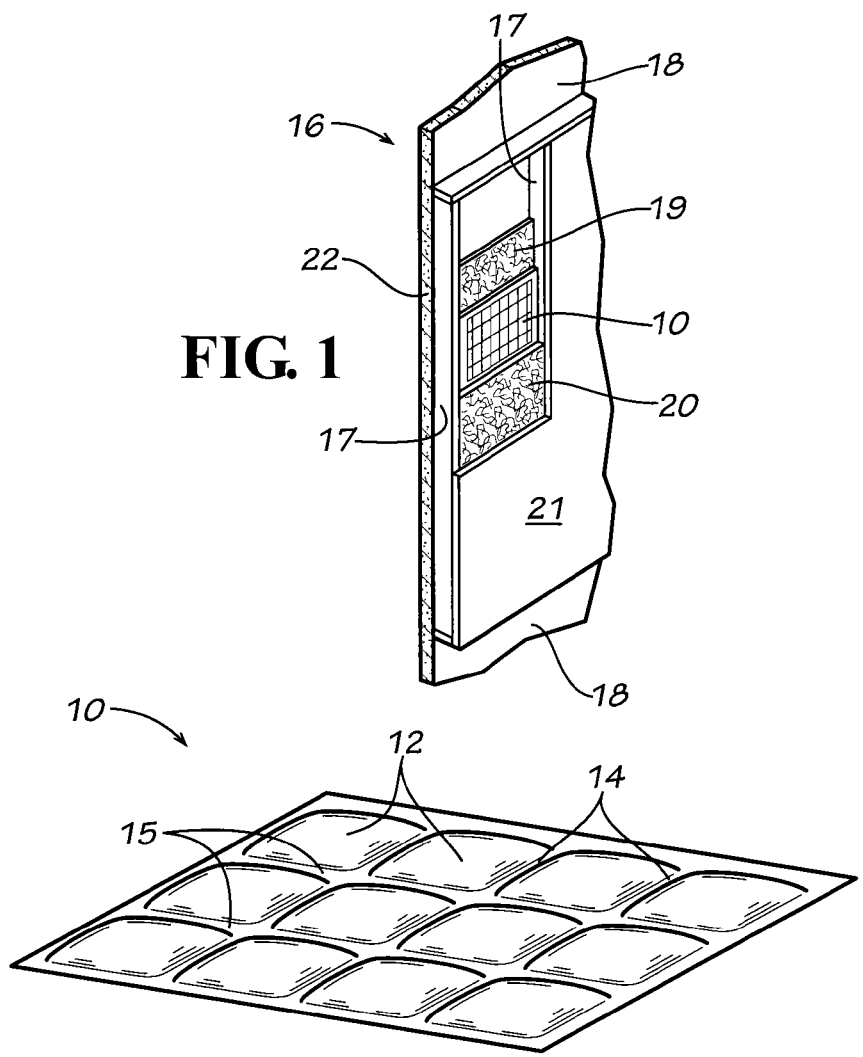
FIG. 1
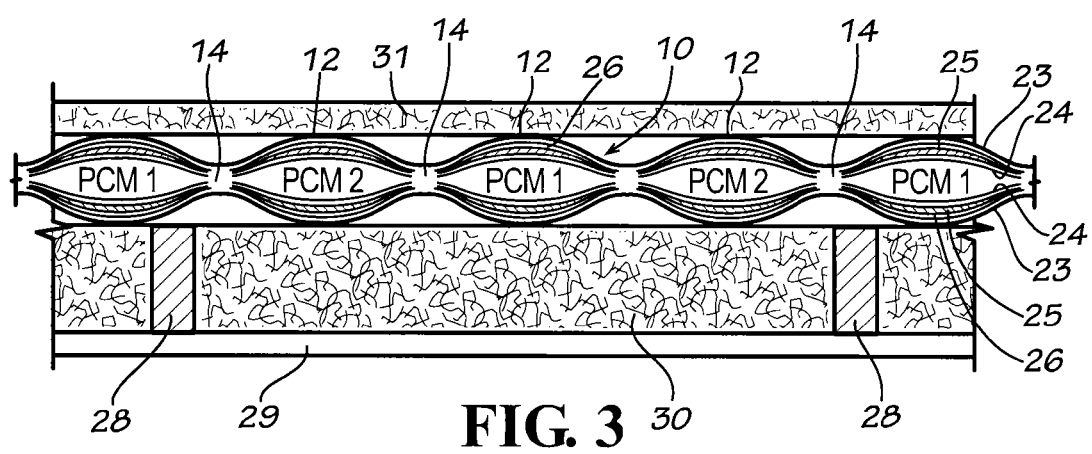
FIG. 2
FIG. 3

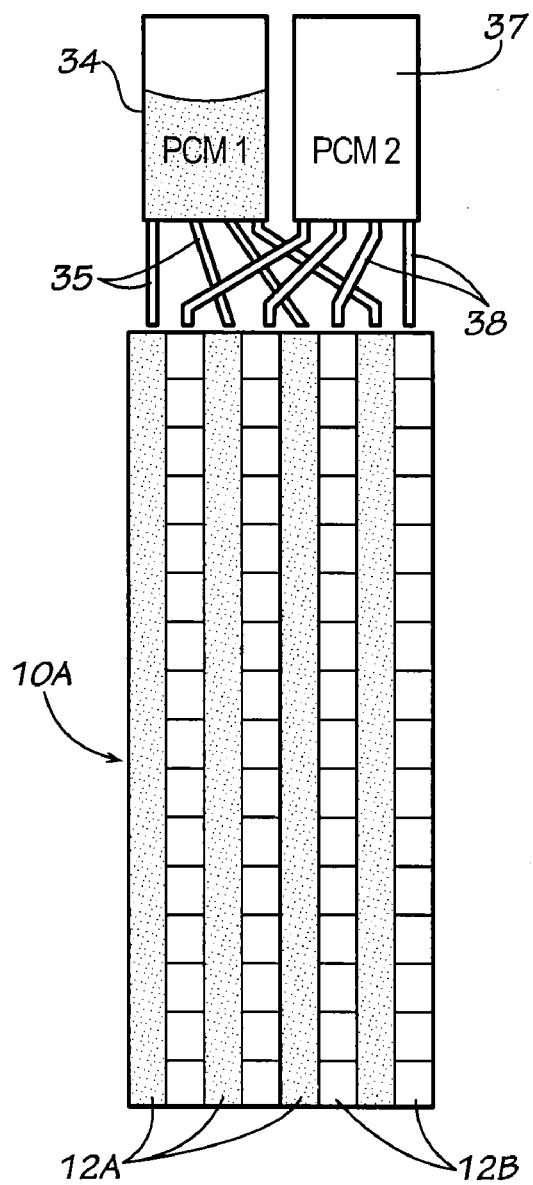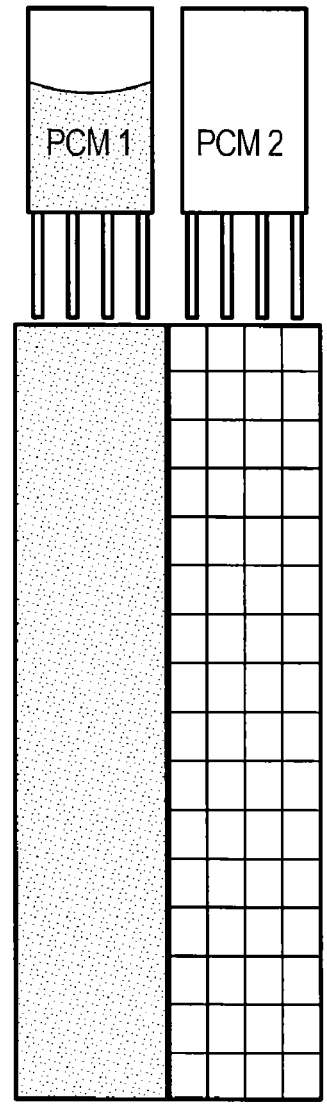
FIG. 5  FIG. 6

MULTIPLE PHASE PCM HEAT INSULATION BLANKET

FIELD OF THE INVENTION

This invention involves heat insulation in building structures whereby the walls, roof, ceiling, floors and other partitions of the building that separate the temperature controlled interior of the building are insulated from an adjacent area, such as the outside atmosphere or an adjacent space. More particularly, this invention involves a heat insulation structure that utilizes, in various combinations, heat reflective material, dead air space, fibrous blanket material and other heat insulation materials for use alone or in combination with PCM in a building structure, to retard the transfer of heat to or from the temperature controlled interior space. Also, the method of making the heat insulated walls is disclosed.

BACKGROUND OF THE DISCLOSURE

Heat insulation material placed in external walls, ceilings, roofs, floors and other areas about a building typically comprise fibrous blanket insulation, such as elongated blankets formed of fiberglass. A principle of the blanket insulation is to form dead air spaces that provide insulation against convection and conduction heat transfer to and from the heat controlled interior spaces of the building structure. The blanket insulation can be formed in small "clumps" and blown into spaces such as into the attics of residential homes and other areas about building structures, and also can be made into elongated blankets formed in a specific width and thickness that are suitable for placement between parallel joists, studs, rafters, purlins and other parallel support structures that are uniformly spaced apart. The elongated blanket, such as a fiberglass blanket, usually is supplied in reels and is cut to the desired length at the job site for placement between the parallel structures.

An example of heat insulation material is fiberglass that is one of the more desirable materials for forming blanket insulation because it holds its shape and traps a substantial amount of air between its fibers to form the dead air spaces. However, the fiberglass alone usually does not provide adequate heat insulation against radiant heat transfer.

A sheet of radiant heat reflective material has been applied in building structures, sometimes in combination with other materials such as fibrous blanket material. The reflective material, such as aluminum foil, provides a reflective surface for reflecting radiant heat, thereby functioning as a barrier to radiant heat transfer, and enhancing the insulation capabilities of the other heat insulation materials.

Another insulation innovation that has been developed is the use of phase change material ("PCM") in combination with other heat insulation materials. The PCM loses heat when it changes phase from a liquid to a solid and absorbs heat when it changes phase from a solid to a liquid. These changes of phase occur at a substantially constant temperature for the PCM. The net result is that when the PCM is used in a wall structure, such as an external wall structure, and the temperature of the outside surface of the wall structure begins to rise from a temperature lower than the phase change temperature to a temperature higher than the phase change temperature, and the rising heat is transferred to the PCM, the PCM will remain at its phase change temperature as the PCM changes phase from a solid to a liquid. As it changes phase, the PCM absorbs heat transferred from the outside surface of the wall structure without changing its own temperature. This effectively delays the transfer of heat from the outside surface of the external wall to the inside of the building structure, reducing the load to be carried by the conventional air conditioning system of the building structure.

The reverse is true when the outside surface temperature of the wall structure becomes lower than the phase change temperature of the PCM. The PCM changes phase from liquid to solid at a substantially constant temperature, gradually giving up its heat to the outside cooler atmosphere. This delays the transfer of heat from the warmer interior of the building to the cooler outside atmosphere.

The use of PCM as an insulator for building structures is disclosed in U.S. Pat. Nos. 5,626,936 and 6,645,598 and U.S. published Patent Application 2008/0282637, published Nov. 20, 2008, which are incorporated herein by reference.

Although the use of PCM has been disclosed in the prior art as being used as an insulator for building structures, there may be times when the temperature transmitted through one surface of a wall to the PCM located in the wall does not pass the phase change temperature of the PCM. This makes the PCM ineffective to reduce the transfer of heat through the outside wall by changing phase. For example, when the PCM is placed in an exterior wall, the temperature of the outside surface of the exterior wall as heated by the sun in day time hours is the source of the heat that is transferred through the wall to the PCM. The day time temperature of the outside surface of the exterior wall facing the sun is likely to be significantly higher than the atmospheric temperature. For example, the outside surface of a sun-heated external wall may be 50° F. higher than the atmospheric temperature. At night time when the sun is not available to heat the exterior wall, the outside surface of the exterior wall may cool but not pass the phase change temperature of the PCM. This makes the PCM substantially ineffective to insulate the wall structure. A similar problem may be encountered in the cold season when the outside temperature of the external wall remains so cold that it is not able to change the PCM into its liquid state.

For example a PCM in an outside wall might be selected that changes phase at a temperature of 70° F. which is just below the controlled interior temperature of 74° F. of the building structure. The PCM would begin to change from a liquid to a solid and give up heat to the outside of the building structure as the night time outside temperature drops below 70° F. This delays the transfer of heat from the heat controlled interior of the building. However, if the temperature of the outside surface of the external wall in the warm season does not decrease enough to pass the phase change temperature of the PCM, the PCM does not change phase from liquid to solid and therefore does not have the capacity to change from a solid back to a liquid the next day and insulate the wall structure from the heat of the next day. Likewise, if the temperature of the outside surface of the external wall in the cold season does not increase enough in the day time hours to pass the phase change temperature of the PCM, the PCM does not change phase from solid to liquid and therefore during the next day there is no liquid PCM available to change back from a liquid to a solid and insulate the wall structure from the heat of the outside surface of the wall structure.

While the foregoing descriptions of how single PCMs may work in an outside wall structure of a building, there are other situations where similar uses of single PCMs would not perform to change phase and therefore not function efficiently to retard the transfer of heat. For example, PCMs may be used in interior walls of a building structure in which a heat source is present on one side of the internal wall and the heat source is intermittently operated to produce heat, such as a timed thermostat of the periodic use of a stove. The heat generated in these situations could function to change the phase of a PCM in the internal wall to a liquid. When the heat source in the room is turned off and the temperature in the room begins to drop below the phase change temperature of the PCM, the PCM could begin to change phase from a liquid to a solid. This would maintain the temperature of the room at a desired level until the PCM changes phase. However, if the heat source in the room does not raise the temperature of the PCM in the wall to a level higher than its phase change temperature, the system of preserving the room temperature does not work.

Thus, there is a need to provide a PCM-insulated wall structures and a method of insulating such wall structures that insulates at both high and low temperatures of the surfaces of the wall structures.

SUMMARY OF THE DISCLOSURE

Briefly described, the present disclosure concerns a heat insulation blanket configured for positioning in a wall structure for modulating the transfer of heat through the wall structure. The heat insulation blanket, (hereinafter sometimes referred to as a "PCM heat insulation blanket") includes at least a first array of pods and a second array of pods with the pods of the arrays substantially uniformly intermixed with each other. A first PCM is disposed in said first array of pods, with the first PCM having a phase change temperature between liquid phase and solid phase. A second PCM is disposed in the second array of pods, with the second PCM having a phase change temperature between liquid phase and solid phase that is different from the phase change temperature between liquid and solid phases of said first PCM.

Another embodiment is a PCM heat insulation blanket formed with pods, and the pods are arranged in first and second parallel columns. The pods of the first column have different phase change temperatures than the pods of the second column.

Another feature of the disclosure is the PCMs may be contained between a pair of laminated sheets that form pods containing the PCM, with the laminated sheets each including an inner barrier film positioned adjacent the PCM, an outer barrier film positioned away from the PCM, and an intermediate sheet of metal foil positioned between the inner and outer barrier films, with the pods of the insulation blanket being formed by lamination of the pair of laminated sheets together about the pods. The metal foil makes the pods vapor impermeable and spreads the heat of the pods to adjacent pods and reflects radiant heat.

Another feature of the disclosure is that a sheet of metal foil positioned between the inner and outer sheets of barrier film may be chosen to transfer heat between the pods when the different PCMs of adjacent ones of the pods change temperatures. This provides the blanket the capacity to maintain both of the PCMs at about the same temperatures.

Another feature of the disclosure is the process of insulating an external wall structure from the transfer of heat by including at least one PCM heat insulation blanket in the wall structure that includes a first array of pods containing a first PCM and a second array of pods containing a second PCM, with the first and second PCMs in thermal communication with one another to reach similar temperatures. One of the PCMs has a phase change temperature higher than the phase change temperature of the other PCM, such that there will be a change of phase of at least one of the PCMs on days when the exterior surface of the outside wall remains higher than or lower than the phase change temperature of the other PCM.

Another feature of the disclosure is the use of at least two PCMs in the external walls of a building structure, each PCM having different phase change temperatures, and the PCMs used as an insulator in the building structure to delay the transfer of heat through of the walls of the building structure.

This disclosure also concerns improving the insulation installed in walls, ceilings and roofs by having multiple PCMs that form a "range" of phase change temperatures. This overcomes the problem that exists when a single PCM has a phase change temperature that falls outside of the temperature cycle. For example, the wintertime temperature cycle favors a lower PCM phase change temperature and the summertime cycle favors a higher PCM temperature phase change. A single PCM may work properly in the winter season, but may be limited or not work at all in the summer season, or vice versa.

Multiple PCMs therefore can work in a much broader range of conditions and achieve greater insulation benefit for the building structure.

The PCM can be any material that changes between a liquid state and a solid state in response to the change in temperature. PCM suitable for use in this embodiment may include calcium chloride hexahydrate, sodium sulfate, paraffin, $Na_2SO_4.10H_2O$, $CaCl_2.6H_2O$, $NaHPO_4.12H_2O$, $Na_2S_2O_3.5H_2O$, and $NaCO_3.10H_2O$.

The PCM heat insulation blanket described above can be used alone or in combination with various other insulation structures, such as gypsum board, fibrous blanket insulation, between the purlins of an industrial building, in new construction, and in old construction so as to supplement the previously applied or substitute for the previously applied insulations.

Preferably, heat fused seams are formed in the PCM heat insulation blanket that divide the pods from one another and the seams are relatively thin when compared with the length and width of the cells, providing a relatively large cell area in comparison with the area occupied by the seams between the cells.

Preferably, the PCM heat insulation blanket is formed of support sheets that are of heat fusible material, such as polyester and polypropylene. In situations where the fusion of the layers of sheet material is not practical, adhesive bonding of the seams may be possible.

Various objects, features, and advantages of this disclosure will become apparent upon reading the following specification, when taken in conjunction with the accompanying drawings.

BRIEF DESCRIPTION OF THE DRAWINGS

FIG. 1 is a perspective illustration of a detail of an external wall structure, with parts broken away to disclose the blanket insulation of the structure.

FIG. 2 is a perspective illustration of a PCM heat insulation blanket that is to be placed in the wall of FIG. 1.

FIG. 3 is a cross-sectional view of a ceiling structure of a building.

FIG. 5 is a schematic illustration of a process of filling the pods of the PCM heat insulation blanket, with one PCM filling alternate columns and a second PCM filling the other alternate columns.

FIG. 6 is a schematic illustration, similar to FIG. 5 but showing one PCM filling several adjacent columns and another PCM filling several adjacent columns.

DETAILED DESCRIPTION

Figure 4:
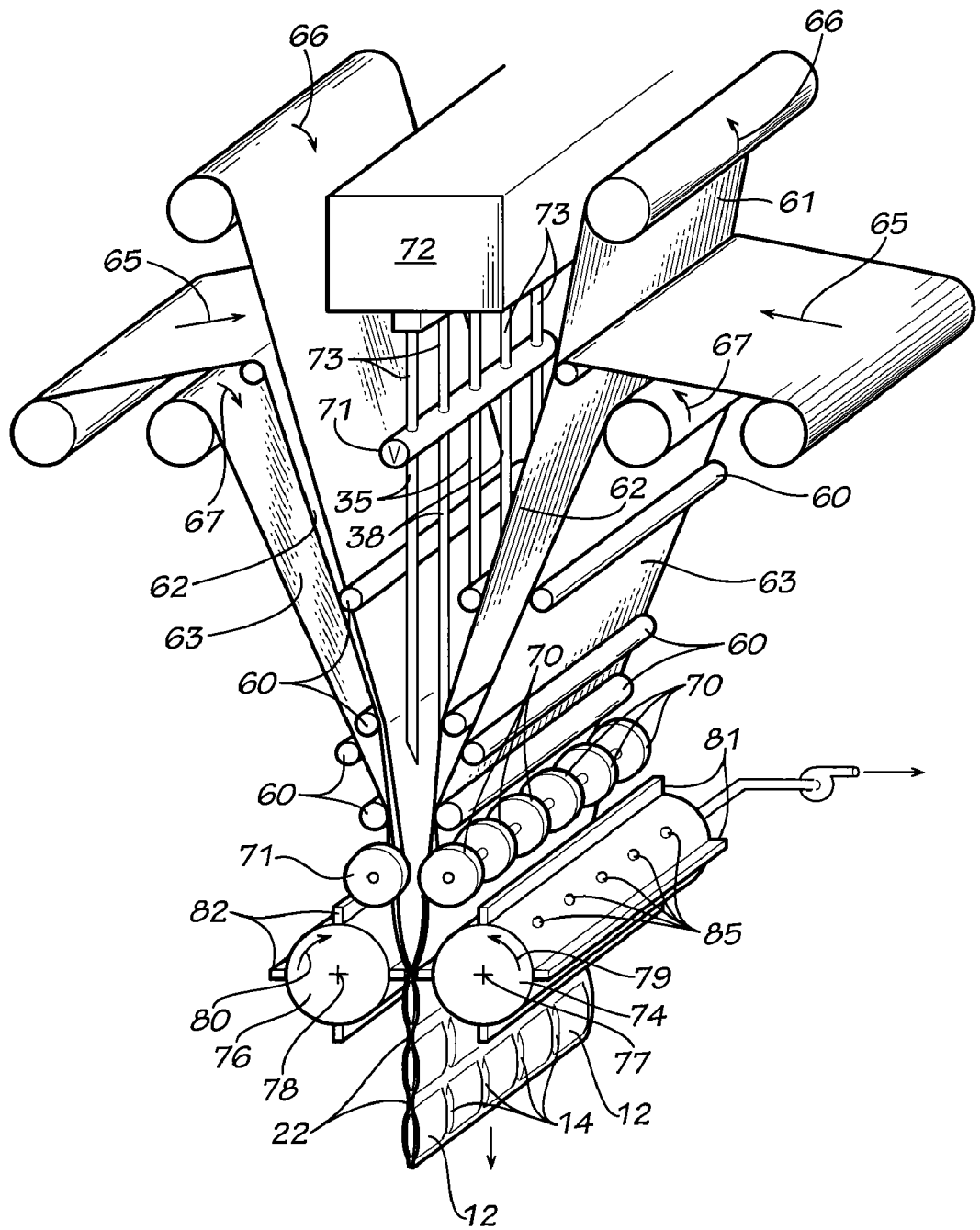
FIG. 4 is a perspective illustration, showing how the PCM heat insulation blankets may be produced.

Referring now in more detail to the drawings, in which like numerals indicate like parts throughout the several views, FIG. 2 illustrates a composite heat insulation blanket or blanket 10 that contains two PCMs that are employed for reducing heat transfer between adjacent spaces about a building structure. The PCM heat insulation blanket 10 includes a series of pods or cells 12 that are formed by heat sealing or bonding layers of thermoplastic material together, with the fused seams 14 intersected by lateral heat fused seams 15.

As shown in FIG. 1, the PCM heat insulation blanket 10 may be inserted in an external wall structure 16 of a building. Typically, a building will include vertically oriented studs 17 that are spaced apart sixteen inches on center. An exterior board 18 closes the space on the outside between the studs 17. Blanket insulation, such as fiberglass blanket 19, may be installed between the studs next to the exterior board 18, the PCM heat insulation blanket 10 installed next, and another blanket of fiberglass 20 installed next. Wall board 21 closes the structure. Other items may be present in the wall structure.

As shown in FIG. 3, the PCM heat insulation blanket may be formed of a pair of laminated sheets that are fused together at the seams 14 and 15. Laminated sheets each may be formed of three layers of material: Outer polyethylene sheet 23, a similar inner polyethylene sheet 24, and an intermediate foil sheet 25. Typically the intermediate foil 25 is to be made of aluminum which has high reflectivity, is a conductor of heat and is vapor impermeable. In the event that adjacent ones of the pods 12 develop a difference in temperature, the intermediate foil sheet 25 transfers heat from the hot pods to the cold pods, attempting to equalize the temperature of the pods in the PCM heat insulation blanket 10. The foil has very low vapor permeability and substantially avoids the transfer of moisture into or out of the pods 12. Material suitable for forming the outer and inner polyethylene sheets include but are not limited to: Saran, Valeron, polyethylene, polypropylene, Marvel Seal 360, Nylon and Aclar.

The foil may be formed of aluminum or other metals preferably that are vapor retardant and with heat reflective and heat conductive characteristics. A laminated sheet having the desired properties is a poly-foil-poly sheet such as Marvel Field 360 from Ludlow Corp. Laminating and Coating Division, and identified by Military Specification MIL-B-131H Type 1, Class 1.

The pods 12 contain PCM. For example, FIG. 3 shows alternate pods containing PCM1 and the other alternate pods contain PCM2. The pods are formed in columns containing PCM1 and the other pods are formed in columns of pods containing PCM2, with the columns of PCM1 being intermixed between the columns of pods bearing PCM2. This arrangement substantially uniformly intermixes the PCMs, with the first PCM being in an array and with the second PCM in its own array that is intermixed with the first array. While the arrays of pods are illustrated in alternate columns, the arrays may be in other forms, such as in lines or in different shapes. Also, the pods for one PCM may be a different size than the pods for another PCM.

FIG. 3 shows the PCM heat insulation blanket 10 installed in a ceiling structure which includes joists 28, a ceiling wall board 29 fastened to the joists, and fibrous insulation material such as a blanket of fiberglass 30 positioned between the joists and resting of the ceiling board 29. The PCM heat insulation blanket 10 may be placed on the joists and fiberglass blanket. Also, an additional fiberglass blanket 31 may be placed over the PCM heat insulation blanket 10. With this arrangement, the PCM heat insulation blanket 10 is sandwiched between layers of fiberglass blanket material.

While the laminated sheets that form the pods of the PCM heat insulation blanket 10 are available commercially, FIG. 4 illustrates a process by which a PCM heat insulation blanket may be produced. Multiple sheets or plies 61, 62, and 63 are fed from their supplies from opposite sides and are advanced along a processing path to pass in superposed relationship between opposed gangs of longitudinal heated sealing wheels 70 and 71. The wheels of the gang 70 are urged toward the wheels of the gang 71, with the superposed plies of sheet material passing between the wheels. As the wheels make contact with the superposed plies of sheet material, they heat and fuse the sheet material, forming the longitudinal seams 14 in the sheets. This causes the formation of longitudinal pockets in the superposed sheets.

In the meantime, laterally extending sealing drums 74 and 76 are rotatable about their laterally extending axes 77 and 78 in the directions as indicated by arrows 79 and 80, and the laterally extending ribs 81 of the sealing drum 74 register with the laterally extending ribs 82 of the sealing drum 76. The sealing drums 74 and 76 are heated, and their ribs are heated, to a temperature that causes the superposed sheets advancing along the processing path to fuse in response to the contact of the ribs 81 and 82. This forms the lateral seams 22 in the superposed sheets, closing the pouches into cells, as best illustrated in FIGS. 2, 3, and 5-7.

In the meantime, the laterally extending sealing drums 74 and 76 each include surface ports 85 that communicate with internal, longitudinally extending conduits 86 (FIG. 10), with the internal conduits opening through one end of each of the sealing drums 74, 76. A vacuum shoe (not shown) is applied to the end of each sealing drum, and each vacuum shoe 88 is in communication with inlet of a blower that draws air through the vacuum shoe and through the internal conduits and surface ports 85 that register with the vacuum shoe. This induces an area of low pressure adjacent the surface of the laterally extending sealing drums, adjacent the superposed outer sheets 23, causing the outer sheets 23 to be moved away from the intermediate foil 25. This lateral movement draws gas in between the outer sheets and the intermediate foils 25, so that when the sealing drums fuse the superposed sheets together, dead air space 26 will be formed between the outer polyethylene sheets 23 and their respective intermediate foils 25, as illustrated in FIG. 3. The gas that fills the dead air space will be air unless another gas is supplied.

As shown in FIGS. 2 and 4, the cells of the PCM heat insulation blanket are formed in an array of pods, with adjacent pods being divided from one another by intervening longitudinal fused seams 14 and intersected by lateral heat fused seams 15. The pods may be of substantial equal volume and thickness as shown in FIGS. 2-4. However, it is also possible to form the pods of different volumes, as may be desired.

The center of the pods 12 are filled with PCM, such as calcium chloride hexahydrate, sodium sulfate, paraffin, $NaA_2SO_4.10H_2O$, $CACl_2 6H_2O$, $Na_2S_2O_3.5H_2O$, $NaCO_3.10H_2O$, $NaHPO_4.12H_2O$. It may be desirable to fill the spaces between the outer polyethylene sheet and the intermediate foil, and/or the intermediate foil and the inner polyethylene sheet with gas, usually air. This tends to space the intermediate foil sheet 25 from its adjacent polyethylene sheets, thereby maintaining some reflectivity capability of the foil, capable of reflecting radiant heat. Other gases that may be used in the layers of the pods are Argon, Freon, Nitrogen, Carbon Dioxide, Krypton, and Xenon.

While FIG. 4 shows an example of the possible apparatus that can be used to produce the PCM heat insulation blanket, other conventional filling devices may be used as may be convenient and appropriate.

FIG. 5 shows a schematic arrangement of depositing two PCMs into the pods of the PCM heat insulation blanket 10A. PCM1 is dispensed from a container 34 through delivery conduits 35 to alternate ones of the columns 12A, while PCM2 is delivered from its container 37 through delivery conduits 38 to the other alternate column of pods 12B. This substantially uniformly intermixes the PCMs among one another so that PCM1 will have a lower phase change temperature while PCM2 may have a higher phase change temperature. In addition, since the PCMs with different phase change temperatures are immediately adjacent one another, there is an assurance that the temperature of the adjacent PCMs will be approximately the same, not only because of their proximity but also because of the use of the metal foil extending through the pods that contain the PCMs. The metal foil tends to conduct heat among the pods, tending to maintain both PCMs at approximately the same temperature.

While FIGS. 4-6 show a process of forming the PCM heat insulation blanket so that it includes first and second arrays of pods that are substantially uniformly intermixed with one another, other formations may be used, as desired, with a preferred embodiment having the two PCMs intermixed adjacent one another so that the two or more PCMs are available for the transfer of heat broadly across the entire surface of the PCM heat insulation blanket.

FIG. 6 shows how the PCMs may be placed in adjacent parallel columns, while retaining a reasonable array of pods broadly intermixed across the entire surface of the PCM heat insulation blanket.

Figure 7:
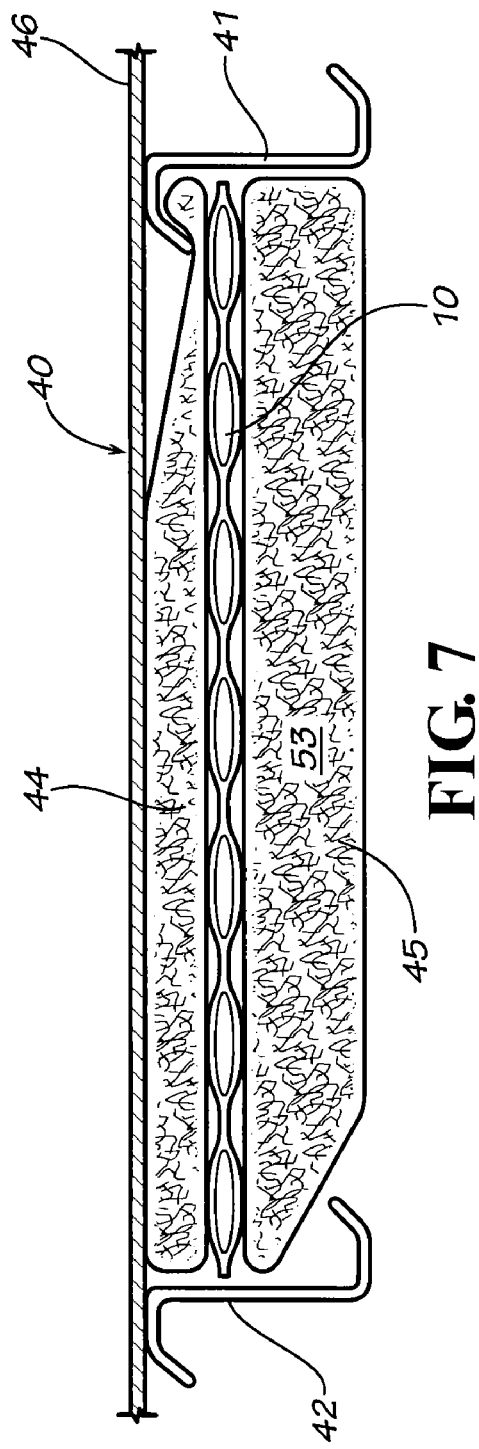
FIG. 7 is a cross-sectional view of a roof structure of an industrial building, showing the PCM heat insulation blanket placed between adjacent layers of fiberglass blanket insulation.

FIGS. 7-10 show further arrangements of placement of the PCM heat insulation blanket in building structures. FIG. 7 shows a typical roof 40 of a metal building where the PCM heat insulation blanket 10 is placed between purlins 41 and 42, with fiberglass blankets 44 and 45 placed on opposite sides of the PCM heat insulation blanket 10. A hard roof material 46 is placed over the structure, connected to the upper surfaces of the purlins 41 and 42.

Figure 8:
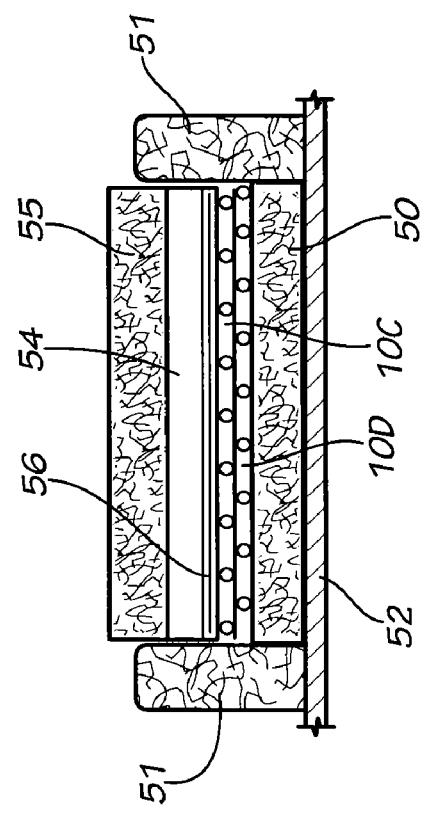
FIG. 8 is a cross-sectional view of a ceiling structure, similar to FIG. 3, but showing the use of a reflective box together with the PCM heat insulation blanket and fiberglass blanket.

While the foregoing disclosure describes and illustrates the PCM being formed in a single PCM heat insulation blanket 10, it is possible to have two or more PCM heat insulation blankets in overlying relationship with different PCMs in each blanket thereby placing the blankets containing PCMs of different melting temperatures adjacent one another as described above, but without requiring both or all of the PCMs to be formed in one sheet. For example, FIG. 8 shows another ceiling insulation arrangement, similar to FIG. 3 wherein fiberglass blanket 50 is placed between the joists 51 on the ceiling board 52, a pair of superposed PCM heat insulation blankets 10C and 10D are laid on the fiberglass blanket 50, the reflective box 54 placed on the PCM heat insulation blanket 10, and more fiberglass blanket 55 placed on top of the reflective box 54. The insulation blankets 10C and 10D may be formed as previously described except that they contain different PCMs that change phase at different temperatures. The use of two PCM heat insulation blankets with different phase change temperatures provides more options for the installer of the PCMs. The reflective box 54 may be substantially hollow except for a sheet of reflective material 56 and function as a spacer. The space above the reflective sheet avoids contact between the reflective sheet and the box so that the reflective sheet has the capability of reflecting radiant heat away from the ceiling board 52.

It should be understood that while this description concerns primarily to the use of two PCMs, other numbers of PCMs may be used, as may be desired.

Figure 9:
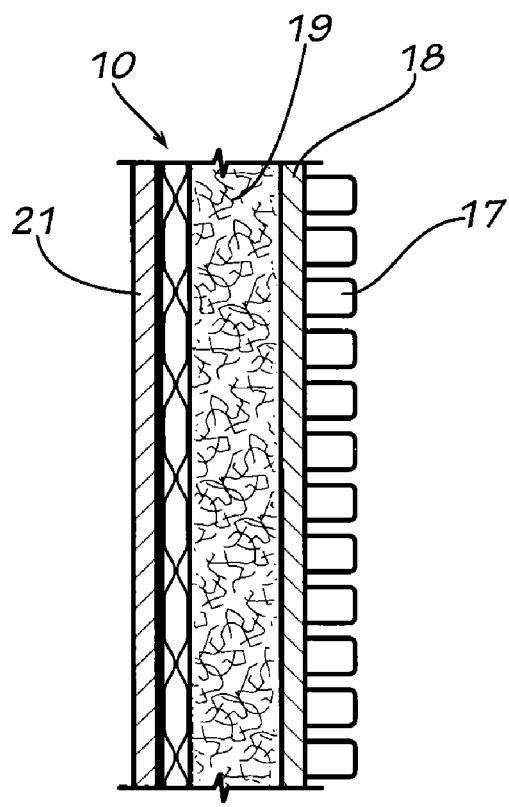
FIG. 9 is a cross-sectional view of an exterior wall of a building structure showing how the PCM heat insulation blanket and fiberglass may be installed in the external wall structure.

FIG. 9 shows a cross-section of an external wall structure, similar to FIG. 1 but showing the structure without the additional fiberglass blanket 19 of FIG. 1 and with the outside façade 22, such as brick 17 applied to the external board 18 in the conventional manner.

Figure 10:
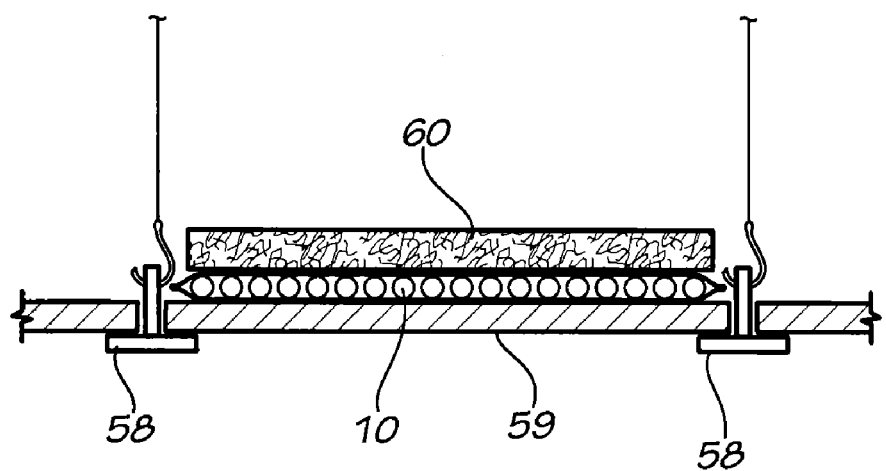
FIG. 10 is a cross sectional view of a portion of a suspended ceiling with the PCM insulation blanket placed on a ceiling tile and fiberglass blanket placed on the PCM insulation blanket.

FIG. 10 shows how a PCM heat insulation blanket may be used in a dropped ceiling. The T-bars 58 are suspended from a higher structure (not shown), conventional ceiling tiles 59 rest at their edges on the t-bars, and PCM heat insulation blankets 10 rest on the ceiling tiles. Additional insulation 60 may be applied to the PCM heat insulation blanket.

Although preferred embodiments of the invention have been disclosed in detail herein, it will be obvious to those skilled in the art that variations and modifications of the disclosed embodiments can be made without departing from the spirit and scope of the invention as set forth in the following claims.

I claim:

1. A heat insulation blanket configured for positioning in a structure for modulating the transfer of heat through the structure,
    said heat insulation blanket including a first array of pods and a second array of pods substantially uniformly intermixed with said first array of pods,
    a first phase change material disposed in said first array of pods, said first phase change material having a phase change temperature between liquid phase and solid phase,
    a second phase change material disposed in said second array of pods,
    said second phase change material having a phase change temperature between liquid phase and solid phase different from the phase change temperature between liquid and solid of said first phase change material.

2. The heat insulation blanket of claim 1, wherein said first array of pods is arranged in first parallel columns and said second array of pods is arranged in second parallel columns intermixed between said first parallel columns.

3. The heat insulation blanket of claim 1, wherein said heat insulation blanket includes a pair of laminated sheets that form said pods,
    said laminated sheets each including a barrier film positioned adjacent said first and second phase change materials, an outer sheet of barrier film, and an intermediate sheet of metal foil positioned between said inner and outer sheets of barrier film.

4. The heat insulation blanket of claim 3, wherein said intermediate sheet of metal foil is configured for transferring heat between said pods when the phase change materials of adjacent ones of said pods change temperatures.

5. The heat insulation blanket of claim 3, wherein said barrier film is selected from the group consisting essentially of: polyethylene, polypropylene, Valeron, Saran, Marvel Seal 360, Nylon, and Aclar.

6. The heat insulation blanket of claim 3, wherein said PCM is selected from the group consisting essentially of calcium chloride hexahydrate, sodium sulfate, paraffin, $NaA_2SO_4.10H_2O$, $CACl_2 6H_2O$, $Na_2S_2O_3.5H_2O$, $NaCO_3.10H_2O$, and $NaHPO_4.12H_2O$.

7. The heat insulation blanket of claim 3, wherein when the temperature adjacent said heat insulation blanket is higher than the phase change temperature of the first phase change material and lower than the phase change temperature of the second phase change material, said first phase change temperature is in the form of a liquid and the second phase change material is in the form of a solid and the phase change materials are at substantially the same temperature.

8. The heat insulation blanket of claim 1, and further including fiberglass applied to said heat insulation blanket.

9. The heat insulation blanket of claim 1, and further including a reflective sheet applied to said heat insulation blanket.

10. The heat insulation blanket of claim 9, and further including a spacer positioned adjacent said reflective sheet for maintaining a space adjacent said reflective sheet.

11. The heat insulation blanket of claim 1, and further including a foam sheet applied to said heat insulation blanket.

12. The heat insulation blanket of claim 1, wherein said heat insulation blanket comprises a pair of superposed heat insulation blankets with said first phase change material in one of said blankets and said second phase change material in said second blanket.

13. A process of insulating a structure from the transfer of heat, comprising:
forming at least one heat insulation blanket that includes a first array of pods containing a first phase change material and a second array of pods containing a second phase change material, and a metal foil positioned between said first and second arrays of pods, with the first and second phase change materials in thermal communication with one another through said metal foil to reach similar temperatures, and with the second phase change material having a phase change temperature higher than the phase change temperature of the first phase change material,
transferring heat between adjacent pods through said metal foil such that the temperatures of the first and second phase change materials of adjacent pods remain substantially the same,
in response to the temperature adjacent said insulation blanket increasing to a predetermined temperature changing the phase of the first phase change material from a solid phase to a liquid phase, and
in response to the temperature adjacent said insulation blanket increasing to a temperature higher than said predetermined temperature changing the phase of the second phase change material from a solid phase to a liquid phase.

14. A process of insulating an external wall of a building structure, said-building structure having a controlled internal temperature room and a wall separating the controlled temperature room from an adjacent space, comprising:
forming at least one heat insulation blanket that includes a first phase change material having a first phase change temperature and a second phase change material having a second phase change temperature higher than the first phase change temperature, with the first and second phase change materials spread substantially uniformly about said wall,
in response to the temperature adjacent said insulation blanket increasing from a temperature below to a temperature higher than the first phase change temperature of the first phase change material, changing the phase of the first phase change material from a solid to a liquid such that the changing of phase absorbs heat through the wall from the higher temperature side of the wall and delays the transfer of heat from the higher temperature side of the wall to the lower temperature side of the wall, and
in response to the temperature adjacent said insulation blanket increasing from a temperature above the first change temperature to a temperature higher than the second phase change temperature of the second phase change material, changing the phase of the second phase change material from a solid to a liquid such that the changing of phase of the second phase change temperature absorbs heat through the wall from the higher temperature side of the wall and delays the transfer of heat from the higher temperature side of the wall to the lower temperature side of the wall.

15. The process of claim 14, and further including forming said at least one heat insulation blanket with first and second arrays of pods, with said first phase change material in said first array of pods and said second phase change material in said second array of pods, and extending metal foil between said first and second arrays of pods, and
transferring heat between said first and second phase change materials through said metal foil.

16. The process of claim 14, and further including the step of
transferring heat between said first and second phase change materials such that the temperatures of the first and second phase change materials remain substantially the same.

17. A process of heat insulating a building structure, comprising:
selecting a first phase change material that changes phase at a first phase change temperature,
selecting a second phase change material that changes phase at a second phase change temperature higher than the first phase change material,
installing the first and second phase change materials in the external wall of a building structure with a controlled temperature on the inside of the external wall and the external surface temperature on the outside of the external wall,
during the cooler season of the year, changing the phase of the first phase change material from solid to liquid in response to the external surface temperature of the external wall of the building structure increasing from below to above the phase change temperature of the first phase change material, and
during the warmer season of the year, changing the phase of the second phase change material from solid to liquid in response to the external surface temperature of the external wall of the building structure increasing from below to above the phase change temperature of the second phase change material.

18. The process of claim 17, and further including the step of:
installing the first and second phase change materials in pods of an insulation blanket, with the pods containing the first phase change material uniformly distributed among the pods containing the second phase change material, and wherein the step of installing first and second phase change materials in the external wall of a building structure includes installing the insulation blanket in the external wall of a building structure.

19. The process of claim 18, wherein the step of installing the first and second phase change materials in pods of an insulation sheet, includes the step of forming the insulation sheet with a metal foil, and transferring heat through the metal foil among the phase change materials for maintaining the temperatures of the first and second phase change materials at substantially the same temperature.

20. A process of maintaining a temperature in a room, comprising:

installing at least one heat insulation blanket in a wall of the room, with the heat insulation blanket including a first phase change material having a phase change temperature and a second phase change material having a phase change temperature different than said first phase change temperature, heating the room until the temperature of the wall and the heat insulation blanket in the wall increase from a temperature lower to a temperature higher than the phase change temperatures of both of said first and second phase change temperatures and changing the phase of said first and second phase change materials from a solid to a liquid, decreasing the temperature of the room until the temperature of the wall and the heat insulation blanket in the wall decreases from above to below the phase change temperature of said first phase change material and changing the phase of said first phase change material from a liquid to a solid and giving up heat through the wall to the room from said first phase change material to maintain heat in the room, and decreasing the temperature of the room until the temperature of the wall and the heat insulation blanket in the wall decreases from above to below the phase change temperature of said second phase change material and changing the phase of said second phase change material from a liquid to a solid and giving up heat to the room from said second phase change material to maintain heat in the room.

* * * * *